United States Patent [19]
Katoh et al.

[11] Patent Number: 5,724,458
[45] Date of Patent: Mar. 3, 1998

[54] LASER BEAM GENERATION CONTROL SYSTEM FOR OPTICAL BAR CODE SCANNER

[75] Inventors: Hiroaki Katoh, Kawasaki, Japan; Ichiro Sebata, San Diego, Calif.; Mitsuharu Ishii; Shinichi Sato, both of Kawasaki, Japan

[73] Assignee: Fujitsu Limited, Kawasaki, Japan

[21] Appl. No.: 354,061

[22] Filed: Dec. 6, 1994

Related U.S. Application Data

[63] Continuation of Ser. No. 794,226, Nov. 19, 1991, abandoned.

[30] Foreign Application Priority Data

Nov. 20, 1990  [JP]  Japan ................... 2-314606

[51] Int. Cl.$^6$ ............................................ G06K 9/00
[52] U.S. Cl. .................................. 382/312; 382/100
[58] Field of Search ........................ 382/312, 100; 356/23, 24, 25, 26; 250/555; 235/455, 462

[56] References Cited

U.S. PATENT DOCUMENTS

| | | | |
|---|---|---|---|
| 3,925,639 | 12/1975 | Hester | 235/61.11 E |
| 4,032,888 | 6/1977 | Broyles | 382/66 |
| 4,160,156 | 7/1979 | Sherer | 235/463 |
| 4,392,056 | 7/1983 | Weyandt | 382/65 |
| 4,639,606 | 1/1987 | Boles | 250/555 |

FOREIGN PATENT DOCUMENTS

A-0 364 676   4/1990   European Pat. Off. ......... G08K 7/10

OTHER PUBLICATIONS

Broockman, et al., "Shutterless Laser Scanner Capable of Class 1 Operation", *IBM Technical Disclosure Bulletin*, p. 5586, vol. 26, Mar. 1984.

European Search Report, the Hague, search mailed Mar. 3, 1993.

*Primary Examiner*—Yon J. Couso
*Attorney, Agent, or Firm*—Staas & Halsey

[57] ABSTRACT

A laser beam generation control system of an optical mark reader device including a laser generating element, a laser generation control unit, a laser scanner unit for scanning a mark, such as a bar code or the like, and a signal processor unit for photoconverting a reflected light to read thereof; wherein the laser beam generation control unit turns ON/OFF the laser generation element by a predetermined duty to carry out a generation of the laser intermittently. Further, when a reflected light from the mark is detected during an intermittent generation of the laser beam, the laser generation element is turned ON to generate a laser beam continuously; and when a reflected light from the mark is not detected for more than a predetermined first time period during a continuous generation of a laser beam, the system is switched from continuous generation to intermittent generation.

15 Claims, 14 Drawing Sheets

Fig.4
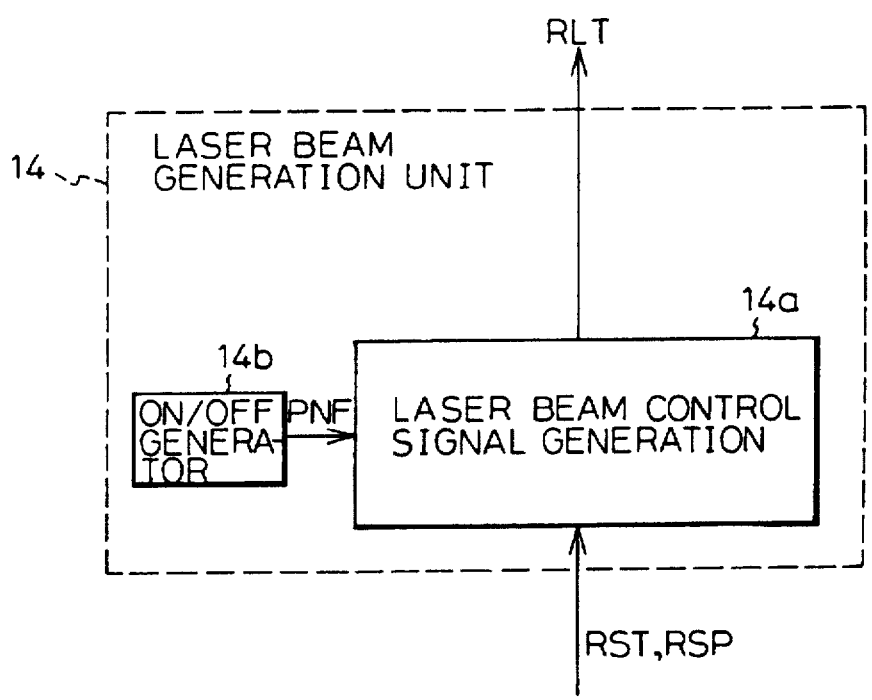
Fig.5(a) PNF
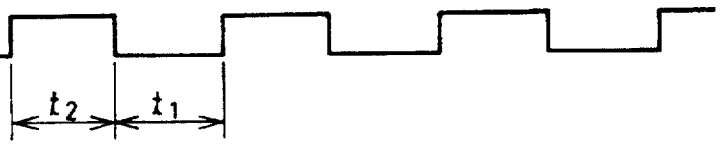
Fig.5(b)
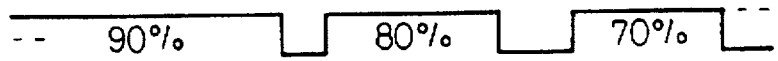

$T_0 > 3 \cdot T_1$
$1.125 T_1 > T_2 > 0.875 T_1$

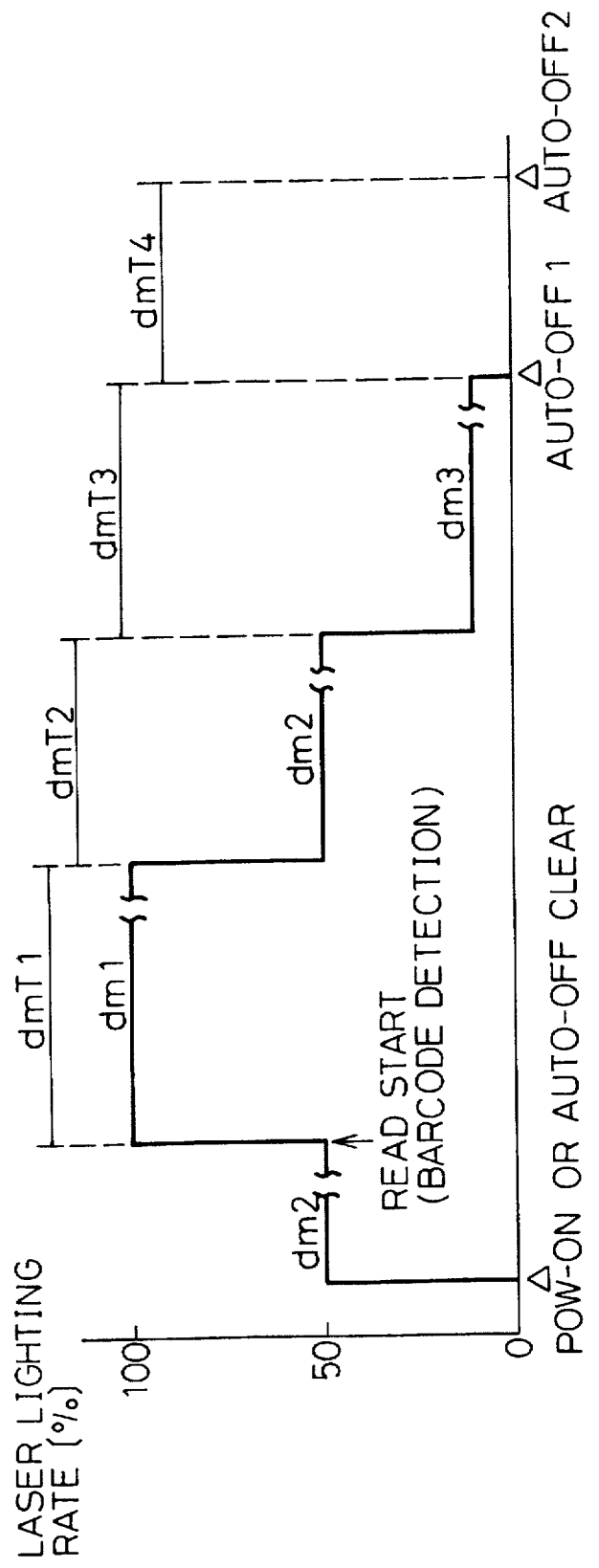

5,724,458

1

LASER BEAM GENERATION CONTROL SYSTEM FOR OPTICAL BAR CODE SCANNER

This application is a continuation of application Ser. No. 07/794,226, filed Nov. 19, 1991, now abandoned.

BACKGROUND OF THE INVENTION

1. Field of the Invention

The present invention relates to a laser beam generation control system for an optical mark scanner device, and particularly to a laser beam generation control system for an optical mark scanner which can shorten a generation period of a laser beam thereby to prolong a laser diode's life.

2. Description of the Related Art

In recent years, as represented by a point-of-sales system in the retail industry, utilization of bar codes has become wide-spread and the necessity of a bar code scanner that is more compact, smaller in size, less expensive and has lower power consumption has grown rapidly. Pot this reason, a laser diode has been developed for a laser beam source and is being used in place of a helium-neon laser oscillator.

Whereas such a laser diode has the advantage that it can be miniaturized in comparison with a helium-neon laser oscillator and can be driven with a low consumption of power, attention is now directed to the life of the laser diode. That is, the life of the laser diode is relatively shorter, and is dependent on a generation time or a burning time and it is necessary to substitute a new laser diode at regular intervals.

Therefore, a laser diode having a long life is desired.

An optical mark reader device such as a bar-code scanner is an input device that illuminates the bar code symbols on tags or products and then detects the reflected light from the bar code symbol. The scanner is passed across the code or the object containing the code is passed across the scanner. Fixed-beam scanners are used to monitor the movement of materials.

In general, in a bar code scanner, the laser diode is turned on only when a bar code is read, and a generation period of the laser thereby is shorted to prolong its life. That is, when the bar code is read, the generation of the laser is generally stopped, and when an article which is passed into a reading space is detected by an optical sensor, which is regarded as an item sensor or an article sensor, or when a reading operation is turned ON, the laser diode is turned ON, thereby to shorten the laser generation time of the laser diode and prolong the life thereof.

Regarding a method for utilizing an item sensor, there are problems in that the operational function is influenced by sensor performance, the provision of the sensor makes the apparatus large in scale and correspondingly, further, can be expensive depending on the manufacturer of the apparatus.

Regarding a method for turning ON/OFF a laser diode by means of a trigger switch, there are problems in that it is necessary to activate a switch whenever a bar code is read and the operation thereof can produce an error such that the bar code is read more frequently than necessary thereby imposing excessive work on the operator.

SUMMARY OF THE INVENTION

It is an object of the present invention to provide a laser beam generation control system for an optical mark scanner that can shorten a generation period of a laser beam without utilizing a trigger switch or an item sensor and thereby extend the life of a laser diode.

2

In accordance with a feature of the invention, there is provided a laser beam generation control system for an optical mark scanner device including a laser generation element, a laser generation control unit, a laser scanner unit for scanning a mark such as a bar code and a signal processor unit for photoconverting a reflected light from the mark thereby to read same, wherein the laser beam generation control unit turns ON/OFF the laser generation element in accordance with a predetermined duty cycle, thereby to carry out the generation of the laser beam intermittently.

BRIEF DESCRIPTION OF THE DRAWINGS

FIG. 4 shows a diagram for explaining a first embodiment of the laser beam generation control unit 14;

FIG. 5 is a waveform diagram of a signal PNF in FIG. 4;

FIG. 16 is a timing chart showing a laser diode control method according to a duty cycle drive control system in accordance with the present invention.

PREFERRED EMBODIMENTS OF THE INVENTION

Figure 1:
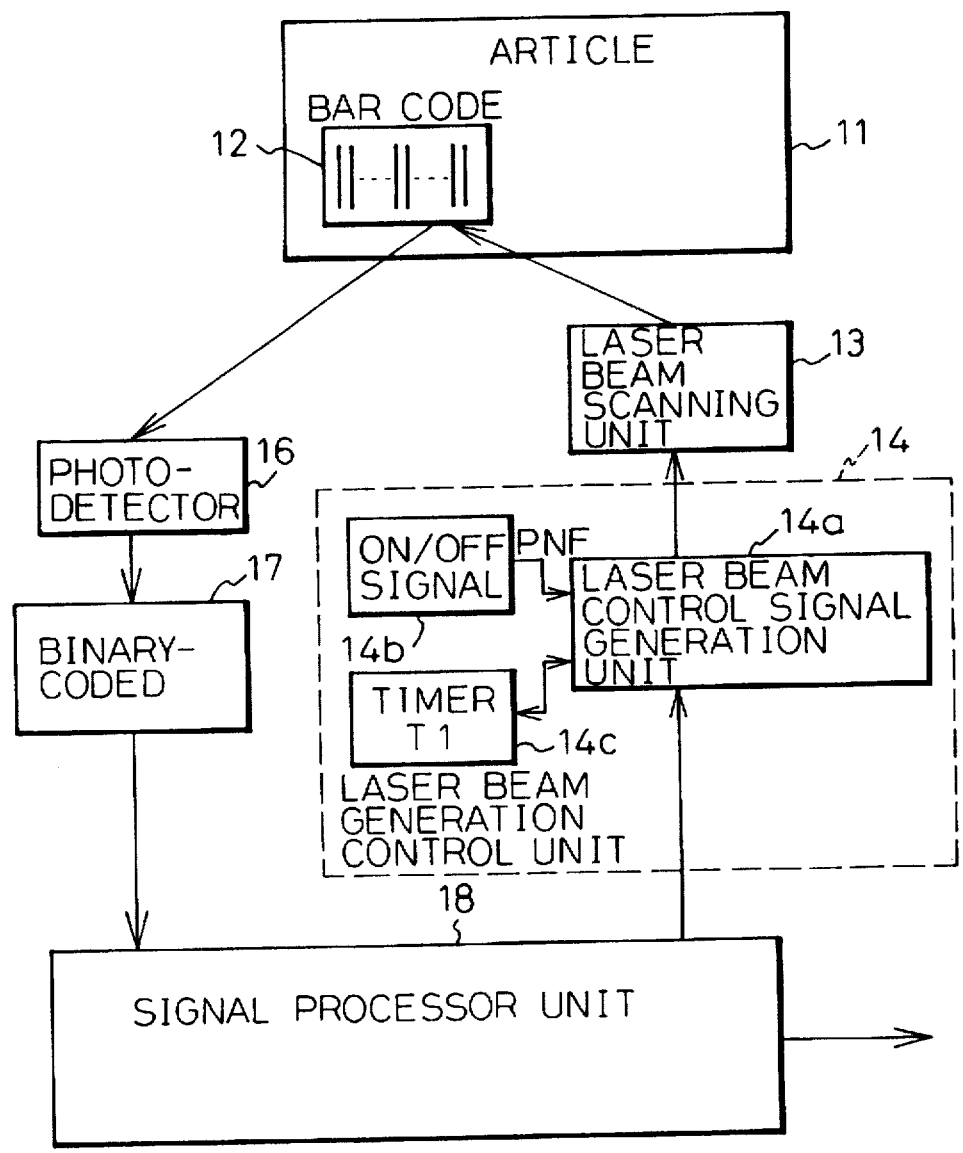
FIG. 1 is a block diagram for explaining an operation of an embodiment, in accordance with the present invention.

FIG. 1 is a block diagram for explaining an operation of an embodiment of the present invention.

Reference numeral 11 denotes an article, 12 a bar code affixed to or printed on the article, 13 a laser scanner for scanning a bar code with a laser, beam. 14 a laser beam generation control unit for controlling the generation of the laser beam by unit 13. 16 a photodetector for carrying out a photoelectric conversion of a reflected laser light beam from the bar code 12. 17 a binary coded circuit unit for binary-coding an output of the photodetector 16, and 18 a signal processor unit for demodulating the bar code data output of the binary coded circuit unit 17 and controlling the whole device. The laser beam generation control unit 14 includes a laser beam control signal generator 14a, an ON-OFF signal generator unit 14b for generating a pulse signal PNF having a predetermined duty cycle, and a timer ("TIMER T1") 14c.

The mode of operation of the apparatus in FIG. 1 is as follows.

The laser beam generation control unit 14 turns ON/OFF a laser beam generation element in the laser scanner 13 in accordance with a predetermined duty cycle thereby to cause unit 13 to generate a laser beam intermittently. If the duty cycle is 50%, the generation period is one-half the time period of a continuous generation period, and thereby doubles the life.

The laser beam generation control unit 14 also turns ON/OFF the laser beam control signal generation unit 14a to generate a laser beam intermittently such that when a detection of a reflected light from the bar code 12 during an intermittent beam generation is discriminated by the photodetector 16, the binary-coded circuit unit 17 and the signal processor unit 18, the laser beam generation element is turned ON thereby to generate a laser beam continuously, whereas when a reflected light from the bar code 12 is not detected for more than a predetermined period of time during a period, or interval, of continuous beam generation, the laser beam generation is switched to intermittent generation. By doing so, the laser beam generation time period is reduced, while the continuous laser beam generation enables the reading of a bar code accurately, which is advantageous when articles arrive continuously for scanning.

Further, when the laser beam generation control unit 14 does not detect a reflected light from a mark or a bar code for more than a predetermined period of time during a continuous generation of the laser beam, it is switched to an intermittent generation, whereas when it does not detect a reflected light from a mark for more than a predetermined period of time during an intermittent generation of the laser beam, the generation of the laser beam is stopped. Thereby, if a power source is not turned OFF at the end of a work period, if the work is finished, or if the device is not being activated such as when customers are scarce, the laser automatically stops generating a beam, thereby to prolong the life thereof. During cessation of laser generation, the operation of a motor or a mark reading portion can be stopped (that is, a power source is turned OFF) to reduce power consumption.

Figure 2:
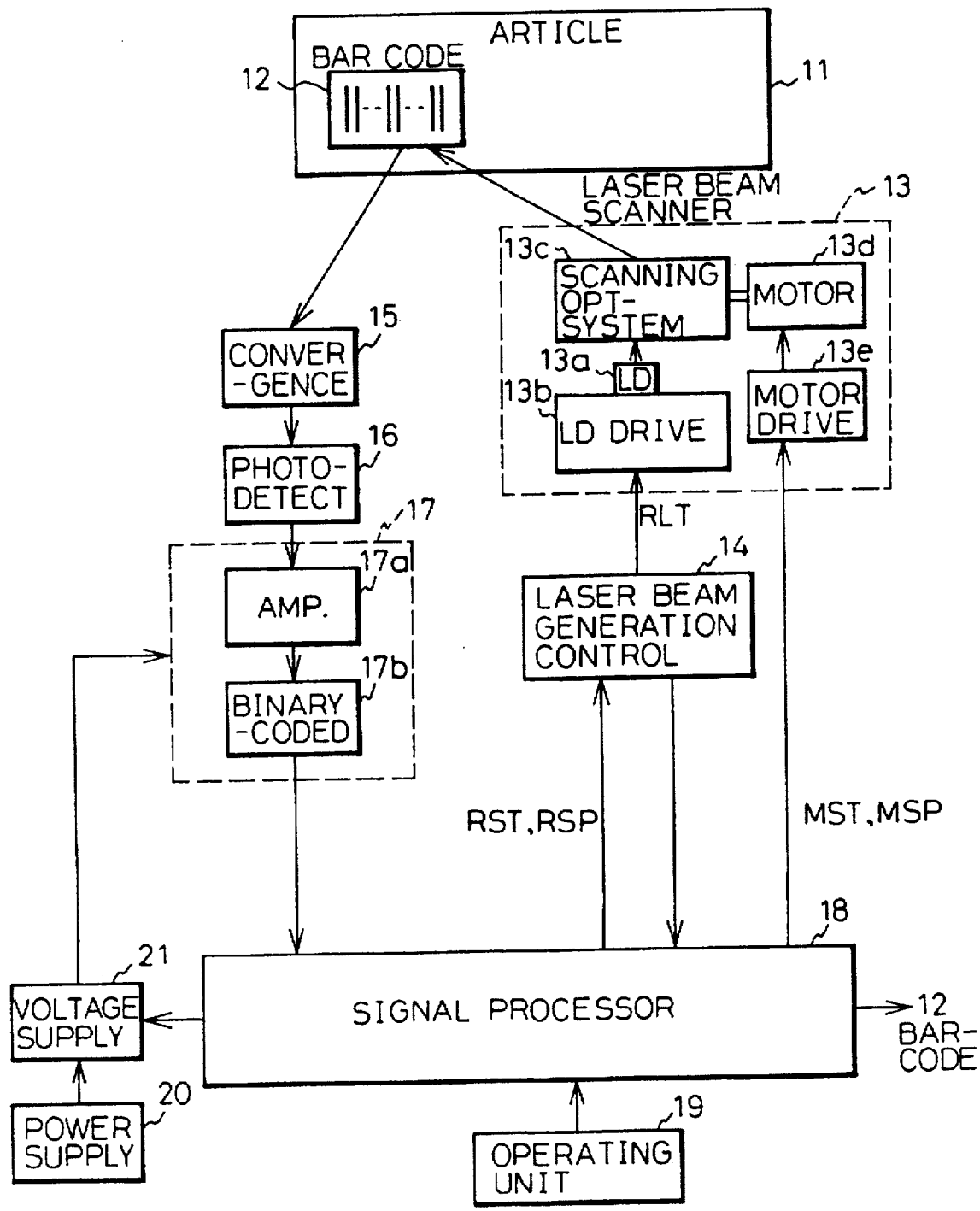
FIG. 2 is a general view showing a construction of a bar code scanner of the present invention.

FIG. 2 is a general view showing a construction of a bar code scanner of the present invention.

In FIG. 2, reference numeral 11 denotes an article, 12 a bar code affixed to or printed on the article, 13 a laser beam scanner for scanning a bar code with a laser beam, 14 a laser beam generation control unit for controlling the generation of a laser beam, 15 a convergence unit for collecting a reflected laser light beam from a bar code, 16 a photodetector for converting the light beam collected in the collector unit into an electrical signal, 17 a binary-coded circuit unit for binary-coding an output of the photodetector, 18 a signal processor unit for demodulating the binary-coded output of unit 17 and controlling the whole device, 19 an operating unit, 20 a power source and 21 a voltage supply circuit for supplying a voltage E (equal to 12 Volt) to a binary-coded circuit unit 17.

LASER BEAM SCANNER

The laser beam scanner unit 13 includes a laser diode 13a generating a laser beam, a laser diode drive unit 13b turning ON/OFF a laser diode by a laser control signal RLT, a scanning optical system 13c for scanning a laser beam on a bar code surface by a rotation operation thereof, a motor 13d for rotating the scanning optical system 13c, and a motor drive circuit 13e.

Figure 3A:
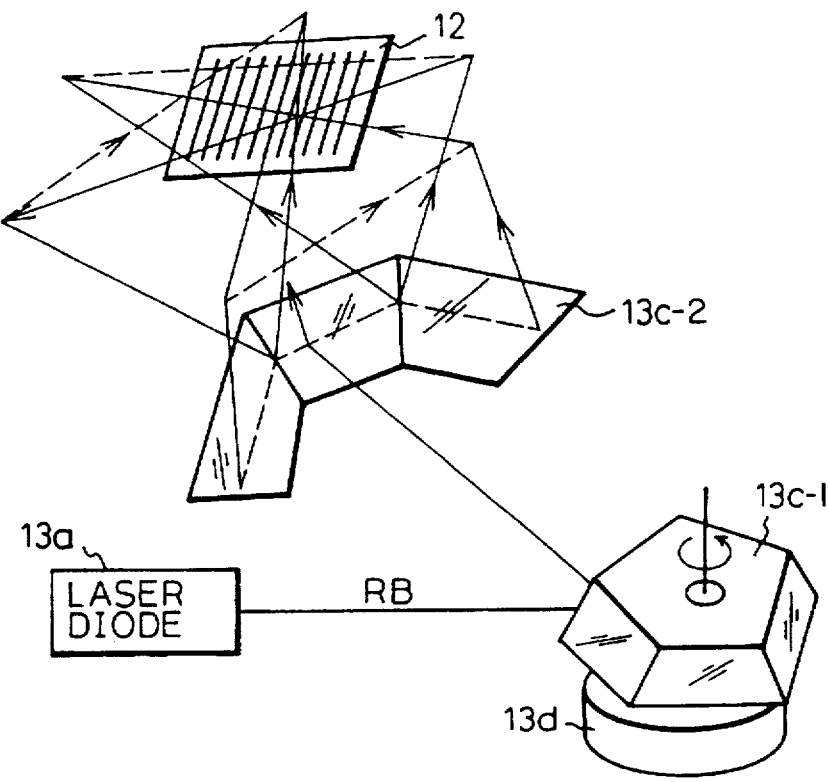
FIGS. 3(A) and 3(B) show a view explaining a barcode scanning unit having a polygonal mirror.
Figure 3B:
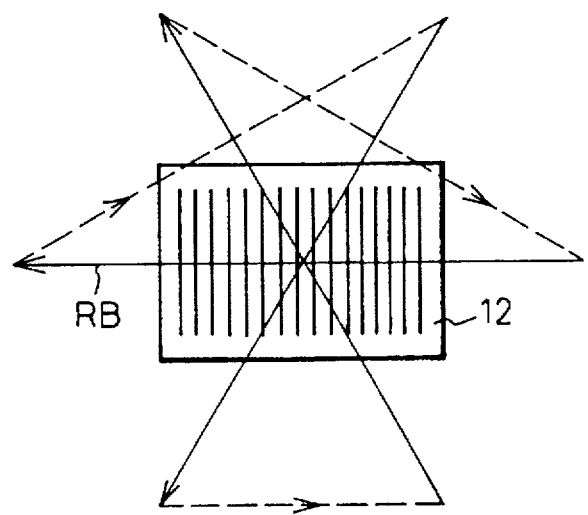

FIGS. 3(A) and 3(B) are diagrams for explaining a bar code scanning unit. The laser beam scanning optical system 13c includes a polygonal mirror 13c-1 and a reflection mirror 13c-2 forming a scanning pattern. A laser beam RB is reflected by the polygon mirror 13c-1, rotated by the motor 13d, and the reflection mirror 13c-2 thereby to scan the bar code surface 12 with a laser beam scanning pattern as shown in FIG. 3(B) by means of only the on rotating mirror 13c-1. The pattern is regarded as a scanning pattern.

A first embodiment of the laser bean generation control unit 14 will be described as follows.

FIG. 4 shows a view explaining a first embodiment of the laser beam generation control unit 14. FIG. 5 is a waveform diagram of a signal PNF produced in unit 14.

As shown in FIG. 4, the laser bean generation control unit 14 includes a laser beam control signal generation unit 14a and an ON/OFF signal generator unit 14b generating a pulse signal PNF for turning ON/OFF the unit 14a in accordance with a predetermined duty cycle. The ON/OFF signal generator unit 14b generates a pulse signal PNF having an ON-time $t_2$ and an OFF-time $t_1$, as shown in FIG. 5(A), where the ON-time $t_2$ is more than a period of the scanning pattern, viz., more than the period of one rotation of the polygonal mirror 13c; the duty cycle may be, for example, 50%, and the period of a pulse signal PNF is considerably shorter than the period, or time interval, in which an article is passed through a read space and is, preferably, equal to one up to several such periods.

The operation of the laser beam generation control unit 14 is now described.

When a read activation switch (not shown in the figure) on the operation unit 19 of FIG. 2 is operated (i.e., actuated), the signal processor unit 18 generates a motor drive signal MST to drive the motor 13d in rotation and at the same time to control a voltage supply circuit 21 to apply a voltage E to the amplifier 17a and the binary-coded circuit 17b in the binary-coded circuit unit 17 and, further, a read start[ing] instruction RST which is input to the laser beam generation control unit 14.

When the read start instruction signal RST is input, the laser beam control signal generation unit 14a inputs the ON/OFF signal PNF produced by the ON/OFF signal generation unit 14b to the laser diode drive unit 13b (Refer to FIG. 2) intact, as the laser control signal RLT.

Thereby, the laser diode drive unit 13b turns ON/OFF the laser diode 13a to scan the bar code 12 of incoming articles with the laser beam.

A reflected light beam from the bar code 12 is converged on the convergence unit 15, and photoconverted by the photodetector 16, and thereafter binary-coded by the binary-coded circuit unit 17 and thereafter is input to the signal processor unit 18.

The signal processor unit 18 demodulates the bar code based on the binary-coded output of unit 17b, thereby to output the bar code data. Thereafter, whenever an article arrives thereat, the above-described read operation is carried out. When the read termination is instructed by a switch on the operating unit 19, a read termination signal RSP and a motor stopping signal MSP are output from the signal processor unit 19, the laser beam generation control unit 14 sets the laser control signal RLT at a LOW level to stop the generation of the laser beam and the motor stops rotating.

The case as described above is such that a duty of the ON/OFF signal PNF is constant, whereas when a reflected light beam is not detected from the bar code for more than a predetermined time, the device may be constituted such that the ON/OFF duty cycle, in the case where an intermittent phenomena occurs, is reduced gradually. In this case, for example, as shown in FIG. 5(B), first the duty cycle is made 100% (a continuous generation), thereafter it is reduced in successive amounts such as to 90%, to 80%, to 70%, to 60%, to 50%, to 40%, to 30%, to 20%, and to 10%—and, when a reflected light is detected from the bar code, it returns to 100%.

Next, the second embodiment of the laser beam generation control unit will be described.

Figure 6:
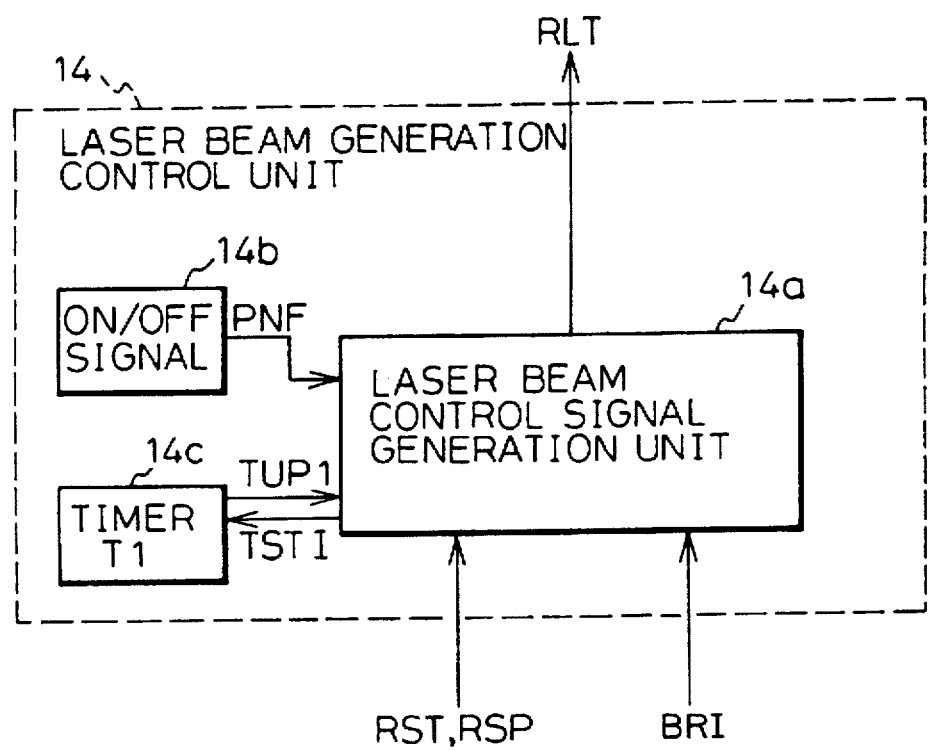
FIG. 6 is a diagram for explaining a second embodiment of the laser beam generation control unit.
Figure 7:
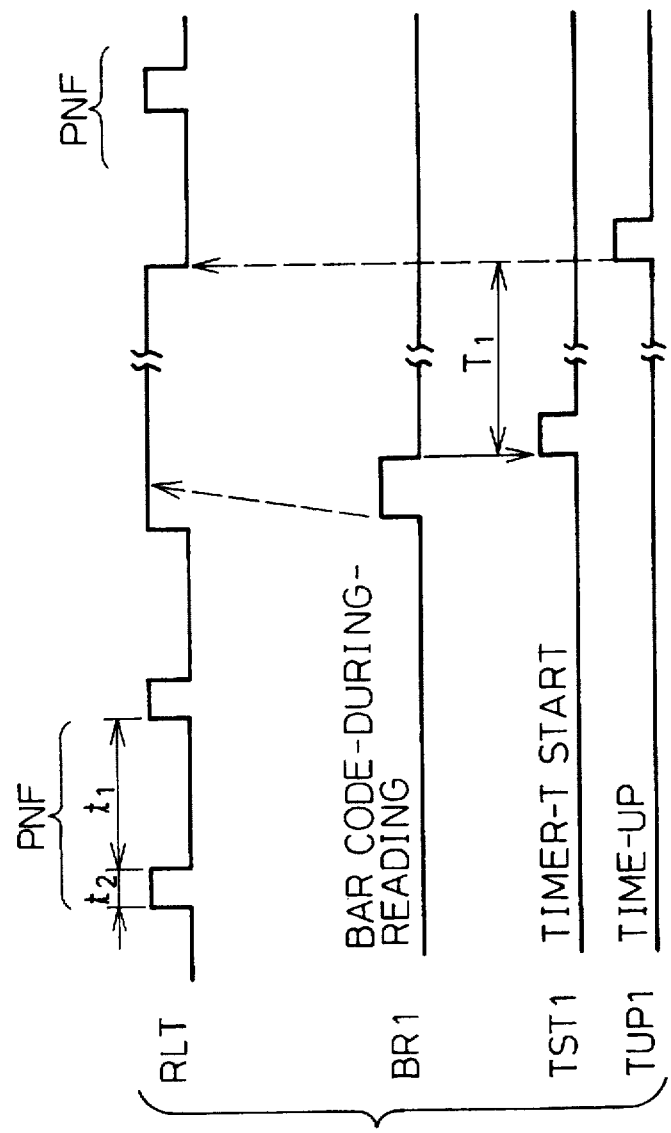
FIG. 7 is a waveform diagram showing the operation of each part of FIG. 6.

FIG. 6 is a block diagram showing a second embodiment of the laser beam generation control unit in accordance with the present invention.

The laser beam generation control unit 14 includes a laser beam control signal generation unit 14a for outputting a laser control signal RLT, an ON/OFF signal generation unit 14b for generating a pulse signal PNF, for carrying out an ON/OFF operation in accordance with a predetermined duty cycle, and a timer 14c for counting a first predetermined time interval $T_1$ (i.e., a continuous generation period). The ON/OFF signal generation unit 14b produces a pulse signal PNF having an ON time $t_2$ and an OFF time $t_1$ and preferably, the ON time $t_2$ is more than one period of scanning pattern, that is, a period of more than one rotation of a polygonal mirror 13c. The ON time $t_2$ is set considerably shorter than the OFF time $t_1$.

In this second embodiment, (1) the laser beam generation control unit 14 turns ON/OFF the laser diode 13a to produce a laser beam intermittently; (2) when a reflected light from the bar code 12 is detected during an intermittent interval of the laser beam generation, the laser diode is turned ON to produce a laser beam continuously; and (3) when a reflected light from the bar code is not detected for more than a predetermined time during an interval of continuous beam generation, the device 14 is switched to a state of intermittent generation as to the control of the generation of the laser beam.

The operation of the laser beam generation control unit 14 is as follows.

When a read activation switch (not shown) in the the operation unit 19 (FIG. 2) is operated, the signal processor unit 1 generates a motor drive signal MST to drive the motor 13d in rotation and at the same time controls a voltage supply circuit 21 to apply a voltage E to an amplifier 17a and a binary-coded circuit 17b in the binary-coded circuit unit 17, and a read start[ing] instruction signal RST is input to the laser beam generation control unit 14.

When the read start instruction signal RST is input, the laser beam control signal generation unit 14a inputs an ON/OFF signal PNF, produced by the ON/OFF signal generation unit 14b, to the laser diode drive unit 13b intact, as the laser control signal RLT.

Thereby, the laser diode drive unit 13b turns ON/OFF the laser diode 13a to scan the bar code 12 of incoming articles by the laser beam.

A reflected light beam from the bar code 12 is converged in the convergence unit 15, photoconverted by the photodetector 16, and thereafter binary-coded by the binary-coded circuit unit 17 and supplied as an input to the signal processor unit 18.

Figure 8:
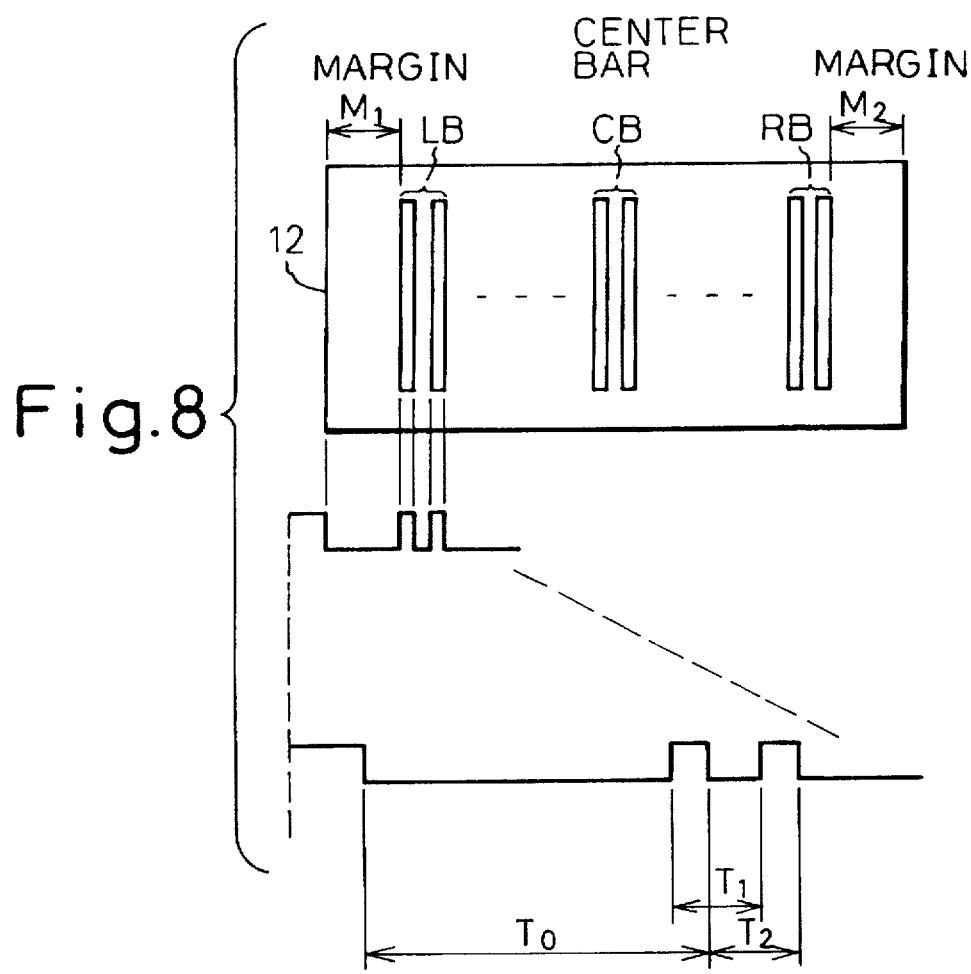
FIG. 8 is a view showing a detecting condition of the bar code.

The signal processor unit 18 monitors whether or not the bar code is detected, based on the binary-coded output. Determining whether or not the bar code is detected is carried out as follows. FIG. 8 is a diagram showing a detecting condition of the bar code. As shown in FIG. 8, a UPC type bar code has margins M1 and M2 at opposite ends of the bar code and four bars (black-white-black-white) LB and RB are provided adjacent to the respective margins M1 and M2, a center bar CB, at the center, and four to six characters of the bar codes which are inserted in a first half part between bars LB and CB and a second half part between bars CB and RB, respectively. When the bars LB and RB of the bar code 12 are scanned by a laser, a binary-coded signal is produced (FIG. 8(B)).

Concerning a bar code, there are the following relations on the pulse width of a binary-coded signal.

$T_o > 3.T_1$ $1.125.T_1 > T_2 > 0.875.T_1$

The signal processor unit 18 monitors whether or not a binary-coded signal that satisfies the above expressions is input and, when input, it outputs a bar code-during-reading signal BRI. When the bar code-during-reading signal BRI is input, the laser beam control signal generation unit 14a is switched from a state of intermittent generation to and maintained thereafter in a state of continuous generation.

Thereupon, the bar code is read and when a concise reading of the bar code is completed, or a setup time has elapsed, the bar code-during-reading signal BRI is removed (i.e., terminated). Thereby, the laser beam control signal generation unit 14a inputs a time counting start instruction TST1 to the timer 14c and causes the timer 14c to start counting.

Hereafter, when a time $T_1$ is counted without the bar code-during-reading signal BRI being input, the timer 14c outputs a time-up signal TUP1. When the time-up signal TUP1 is produced, the laser beam control signal generation unit 14a outputs an ON/OFF signal PNF, which is produced and output by the ON/OFF signal generation unit 14b, as a laser control signal RLT and switches from a state of continuous generation to a state of intermittent generation. Thereafter, the same laser beam generation control is carried out. When a bar code-during-reading signal BRI is input anew in the course of a state of continuous generation, counting of the timer 14c is reset. When a read termination is instructed by a switch in the operation unit 19, a read termination signal RSP and a motor stopping signal MSP are output from the signal processor unit 19 and the laser beam generation control unit 14 sets the laser control signal RLT to a LOW level, thereby to stop the generation of the laser and to stop the driving of the motor, which then stops rotating.

A third embodiment of the laser beam generation control unit 14 is described as follows.

Figure 9:
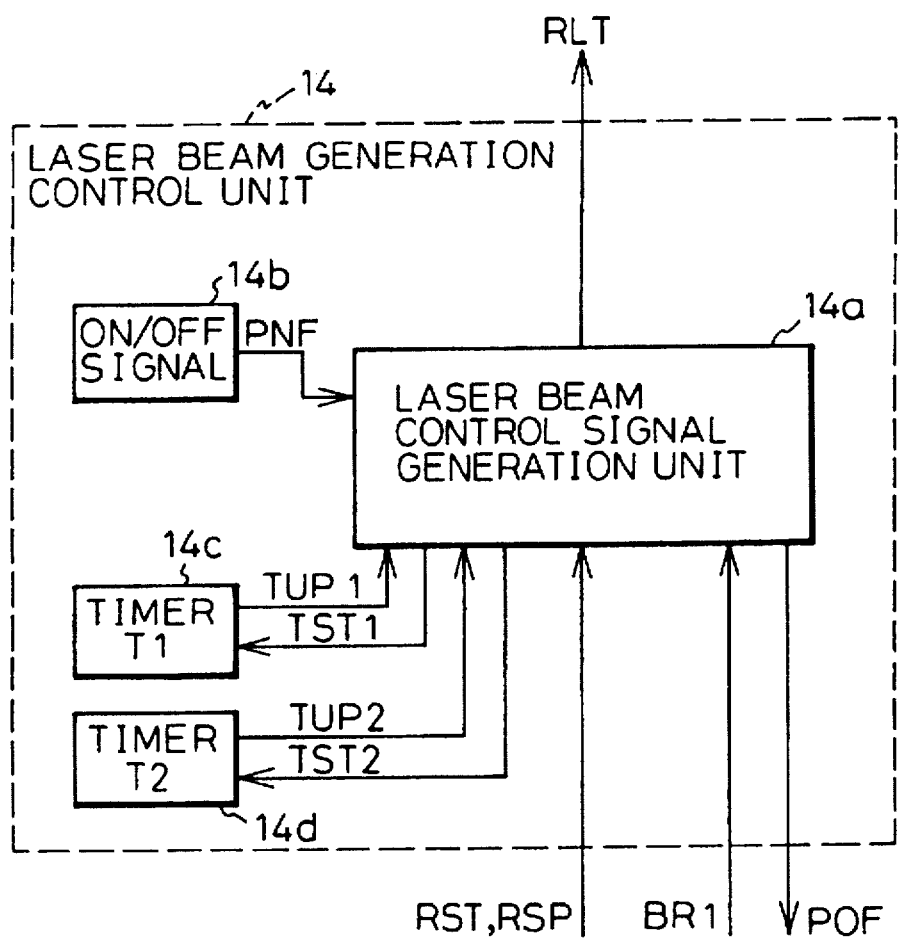
FIG. 9 is a block diagram of a third embodiment of the laser beam generation control unit 14.

FIG. 9 is a block diagram explaining a third embodiment of the laser beam generation control unit 14 of the present invention.

The laser beam generation control unit 14 includes a laser beam control signal generation unit 14a outputting a laser beam control signal RLT, an ON/OFF signal generation unit 14b outputting a pulse signal PNF which turns ON/OFF by a predetermined duty cycle, a timer 14c counting a first predetermined time $T_1$ (continuous generation time period) and a timer 14d counting a second time $T_2$ (a laser generation stoppage time period). It is preferable that the ON time $t_2$ of an ON/OFF signal PNF output from the ON/OFF signal generation unit 14b has a period greater than the period of a scanning pattern, i.e., a period more than that of one rotation of the polygonal mirror 13c.

In this third embodiment, (1) the laser beam generation control unit 14 turns ON/OFF he laser diode 13a to produce a laser beam intermittently; (2) when detecting a reflected light from the bar code during an intermittent generation, the unit 14 turns ON the laser diode to carry out a laser generation continuously; (3) when the unit 14 does not detect a reflected light from the bar code for more than a first time $T_1$ during a continuous generation, the unit 14 is switched to a state of intermittent generation; and (4) when the unit 14 does not detect a reflected light from the bar code for more than a second time $T_2$ during an intermittent generation, it stops the generation of the laser beam.

The operation of the laser beam generation control unit 14 is as follows.

When a read activation switch (not shown in the figure) in the operation unit 19 is operated, the signal processor unit 18 generates a motor drive signal MST to make the motor 13d rotate and at the same time controls the voltage supply circuit 21 to apply a voltage E to an amplifier 17a and a binary-coded circuit 17b in the binary-coded circuit-unit 17 and then a read start instruction signal RST is input to the laser beam generation control unit 14.

Figure 10:
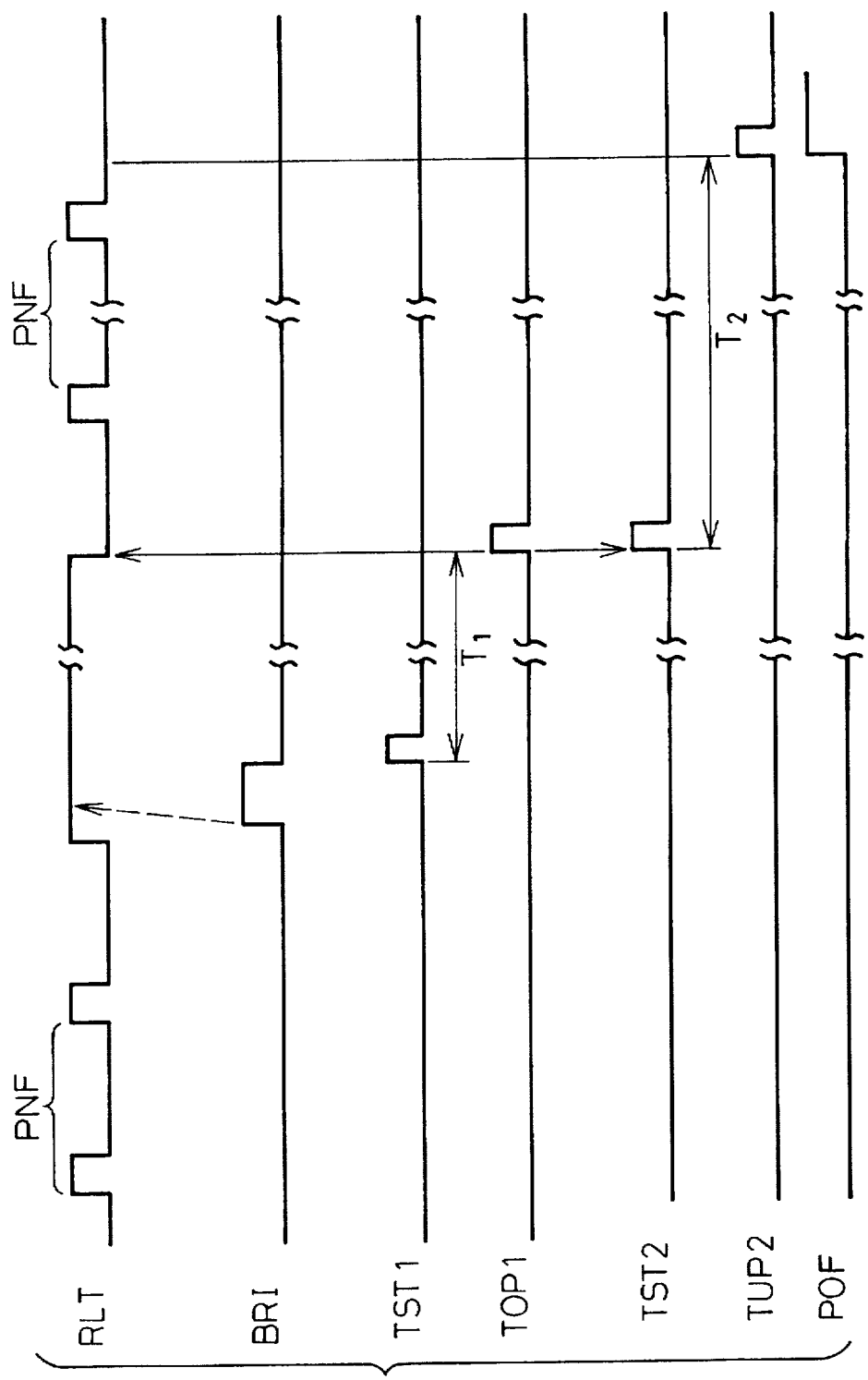
FIG. 10 is a timing chart of the operation of each part in FIG. 9.

When the read starting instruction RST is input, the laser beam control signal generation unit 14a inputs an ON/OFF signal PNF produced from the ON/OFF signal generations unit 14b to the laser diode drive unit 13b intact as the laser control signal RLT (Refer to FIG. 10).

Thereby, the laser diode drive unit 13b turns ON/OFF the laser diode 13a to scan the barcode 12 of the presented articles by the laser beam.

A reflected light from the barcode 12 is converged in the convergence unit 15, photoconverted by the photodetector 16 and thereafter binary-coded by the binary-coded circuit unit 17 and input thereby to the signal processor unit 18.

The signal processor unit 18 monitors whether or not the bar code is detected, based on the binary-coded output and, when detected, the bar code-during-reading signal BRI is output.

When the bar code-during-reading signal BRI is input, the laser beam control signa generation unit 14a is switched from a state of intermittent generation to, and maintained in, a state of continuous generation.

Thereafter, when a reading of the bar code is carried out and a precise read operation of the bar code is completed, or a setup time has elapsed, the bar code-during-reading sinal BRI is removed. Thereby, the laser beam control signal generation unit 14a inputs a time counting start instruction TST1 to the timer 14c to start the timer.

Hereafter, when a time T1 is counted down without the bar code-during-reading signal BRI being input, the timer 14c outputs a time-up signal TUP1. When the time-up signal TUP1 is generated, the laser beam control signal generation unit 14a outputs an ON/OFF signal PNF, generated and output by the ON/OFF signal generation unit 14b, as a laser control signal RLT and thereby switches from a state of continuous generation to a state of intermittent generation. The laser beam control signal generation unit 14a then inputs a count start instructions TST2 to the timer 14d to start it counting.

Thereafter, when the timer 14d counts a time T2 without inputting the bar code-during-reading signal BRI, the time-up signal TUP2 is output. When the time-up signal TUP2 is produced, the laser beam control signal generation unit 14a sets the laser control signal RLT at a LOW level to stop the generation of a laser beam and at the same time outputs a power source OFF instruction POF to the signal processor unit 18, the motor or the like thereupon stops rotating and the voltage supply to the binary-coded circuit unit 17 or the like is terminated.

When a new bar code-during-reading signal BRI is input during a continuous generation of a laser beam, the timer 14c is reset. When a new bar code-during-reading signal BRI is input during an intermittent generation of a laser beam, the timer 14d is reset.

Figure 11:
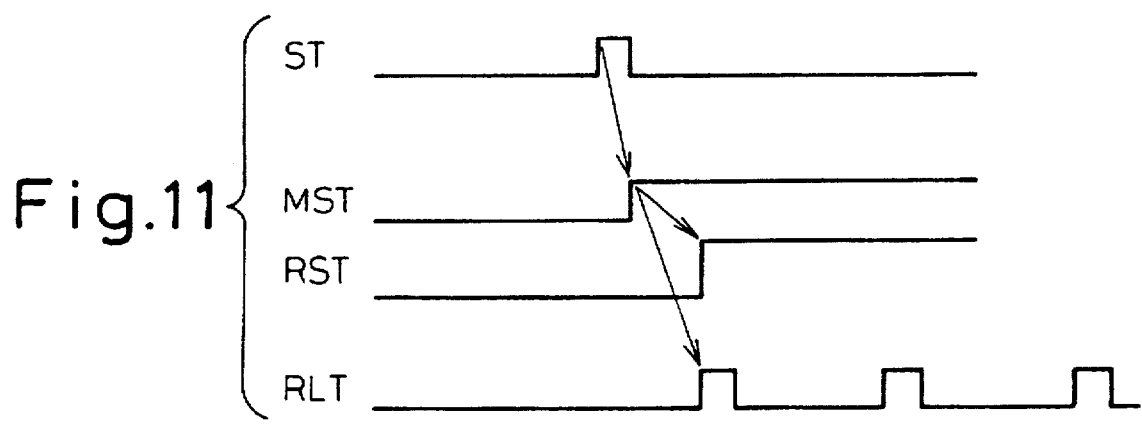
FIG. 11 is a waveform diagram showing a starting performance in FIG. 9.

After the power source is turned OFF<a read activation switch (not shown in the figure) in the operation unit 19 is operated to restart the device and when a start signal ST of the device is produced, the signal processor unit 18 first generates a motor drive signal MST as shown in FIG. 11 to rotate the motor and at the same time the voltage supply circuit 21 is controlled to apply a voltage E to the amplifier 17a and the binary-coded circuit 17b in the binary-coded circuit unit 17. Then, the signal processor unit 18 acknowledges and responds to the rotation of the motor 13d, thereupon to input a read start instruction RST to the laser beam generation control unit 14. Thereby, the laser control signal RLT is output and the above-described operation is carried out thereafter.

The reason why the rotation of the motor is carried out prior to the generation of the laser beam originates from due considerations of safety standards. It prevents a convergence of a laser beam resulting from the occurrence of an emergency.

A fourth embodiment of the laser beam generation control unit 14 is as follows.

Figure 12:
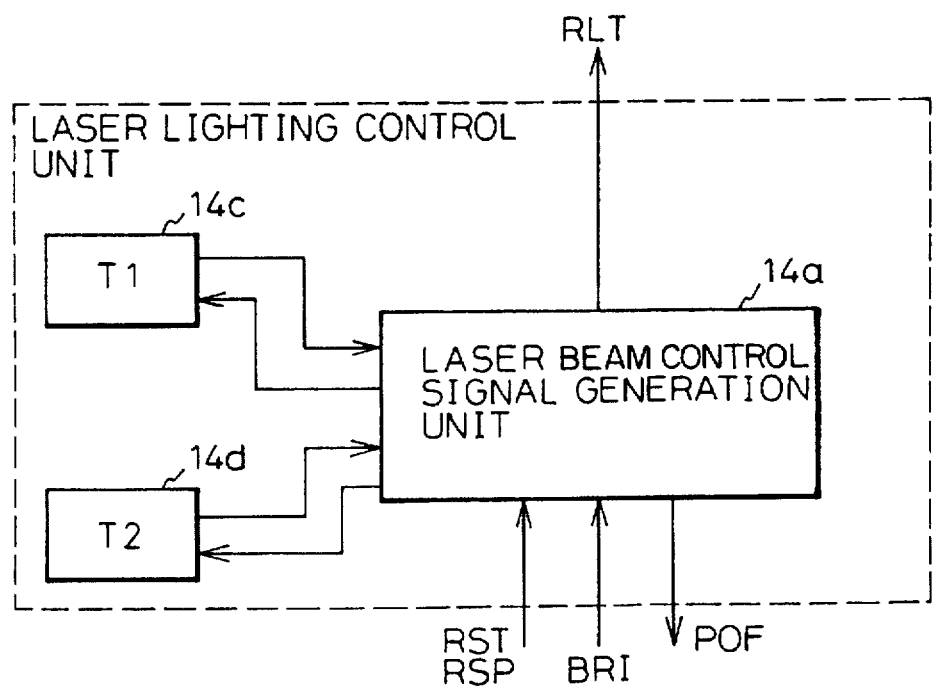
FIG. 12 is a block diagram of a fourth embodiment of the laser beam generation control unit.
Figure 13:
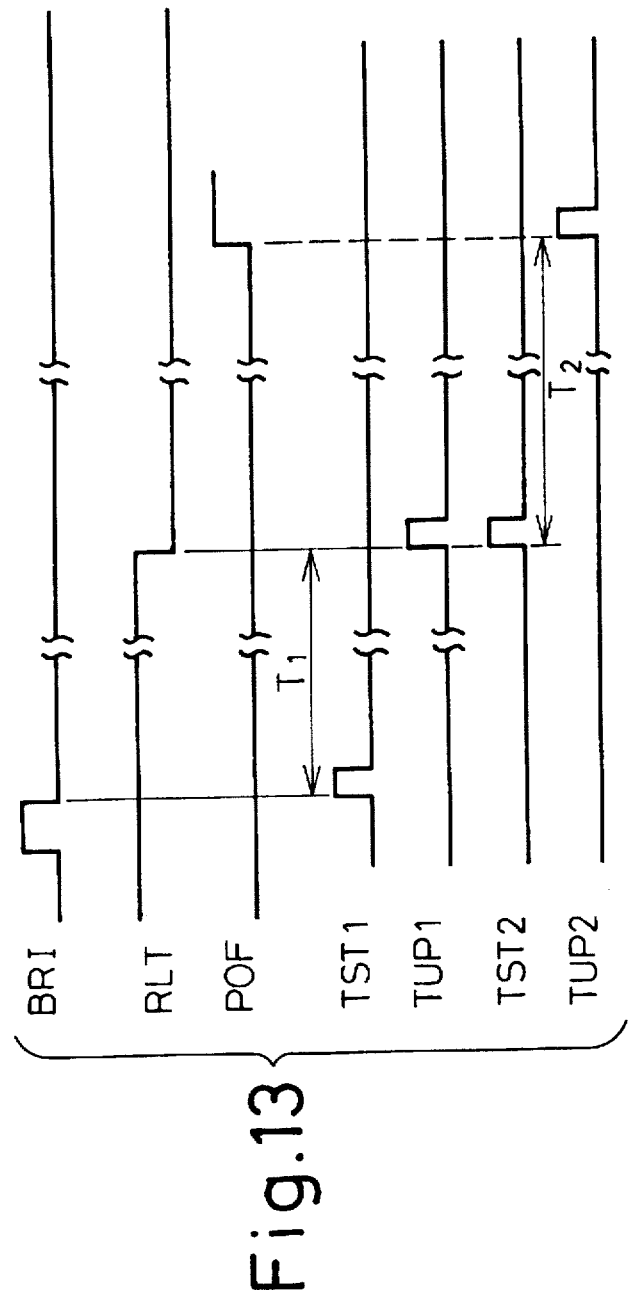
FIG. 13 is a timing chart diagram of the operation of FIG. 12.

FIG. 12 is a block diagram showing a fourth embodiment of he laser beam generation control unit 14 in accordance with the present invention. FIG. 13 is a timing chart of the operation of FIG. 13.

The laser beam generation control unit 14 includes a laser beam control signal generation unit 14a outputting a laser beam control signal RLT, a timer 14c counting a first predetermined time $T_1$ (a time of continuous generation) and a timer 14d counting a second time $T_2$ (a stoppage period for the laser generation). In the third embodiment, there are four states, i.e., continuous generation, intermittent generation, cessation of beam generation and cessation of motor operation or the like. Nevertheless, in this fourth embodiment, intermittent generation is deleted. That is, (1) the laser beam generation control unit 14 stops the generation of the laser beam during continuous generation when a reflected light is not detected from the bar code for a period more than the first time interval $T_1$ and (2) when a reflected light is not detected from the bar code for a period more than the second time period $T_2$ after cessation of the laser, the operation of the motor for driving the laser scanning unit and a mark reading portion is stopped.

The operation of the laser beam generation control unit 14 is as follows.

When a read activation switch (not shown in the figure) in the operation unit 19 is operated, the signal processor unit 18 generates a motor drive signal MST to make the motor rotate and at the same time controls the voltage supply circuit 21 to apply a voltage E to the amplifier 17a and the binary-coded circuit 17b in the binary-coded circuit unit 17. After rotation of the motor is acknowledged, a read starting instruction RST is input to the laser beam generation control unit 14.

When the read start instructions RST is input, the laser beam control signal generation unit 14a inputs a HIGH level laser beam control signal RLT to the laser diode drive unit 13b. Thereby, the laser diode drive unit 13b turns ON/OFF the laser diode 13a to scan the bar code 12 of incoming articles with the laser beam.

A reflected light beam from the bar code 12 is converged in the convergence unit 15, photoconverted by the photodetector 16 and binary-coded by the binary-coded circuit unit 17 and input thereby to the signal processor unit 18.

The signal processor unit 18 monitors whether or not the bar code is detected, based on the binary-coded output and, when detected, the bar code-during-reading signal BRI is output.

When reading of the bar code is carried out and a precise read operation of the bar code is completed, or a setup time has elapsed, the bar code-during-reading signal BRI is removed. Thereupon, the laser beam control signal generation unit 14a inputs a counting start instruction TST1 to the timer 14c to start the same.

Hereafter, when the bar code-during-reading signal BRI is not input while the timer 14c counts a time T1, the time-up signal TUP1 is output. When the time-up signal TUP1 is generated, the laser beam control signal generation unit 14a sets the laser control signal RLT to a LOW level thereby to stop the generation of the laser beam. Further, the laser beam control signal generation unit 14a inputs a counting start instruction TST2 to the timer 14d to start the same.

Thereafter, when a bar code read activation signal is not generated from a switch, a sensor or the like (not shown in the figure) but the timer 14d counts the time T2, the time-up signal TUP2 is output.

When the time-up signal TUP2 is generated, the laser beam control signal generation unit 14a outputs a power source OFF instruction POF to the signal processor unit 18, the motor or the like stops rotating and a supply of voltage to the binary-coded circuit unit 17 or the like is stopped.

When a new bar code-during-reading signal BRI is input during a continuous generation of the laser beam, the counting operation of the timer 14c is reset and when a bar code read activation signal is generated from a switch, a sensor or the like (not shown in the figure) during cessation of the beam generation, the timer 14d is reset and, at the same time, a HIGH level laser beam control signal RLT is output and the laser starts generating continuously.

Figure 14:
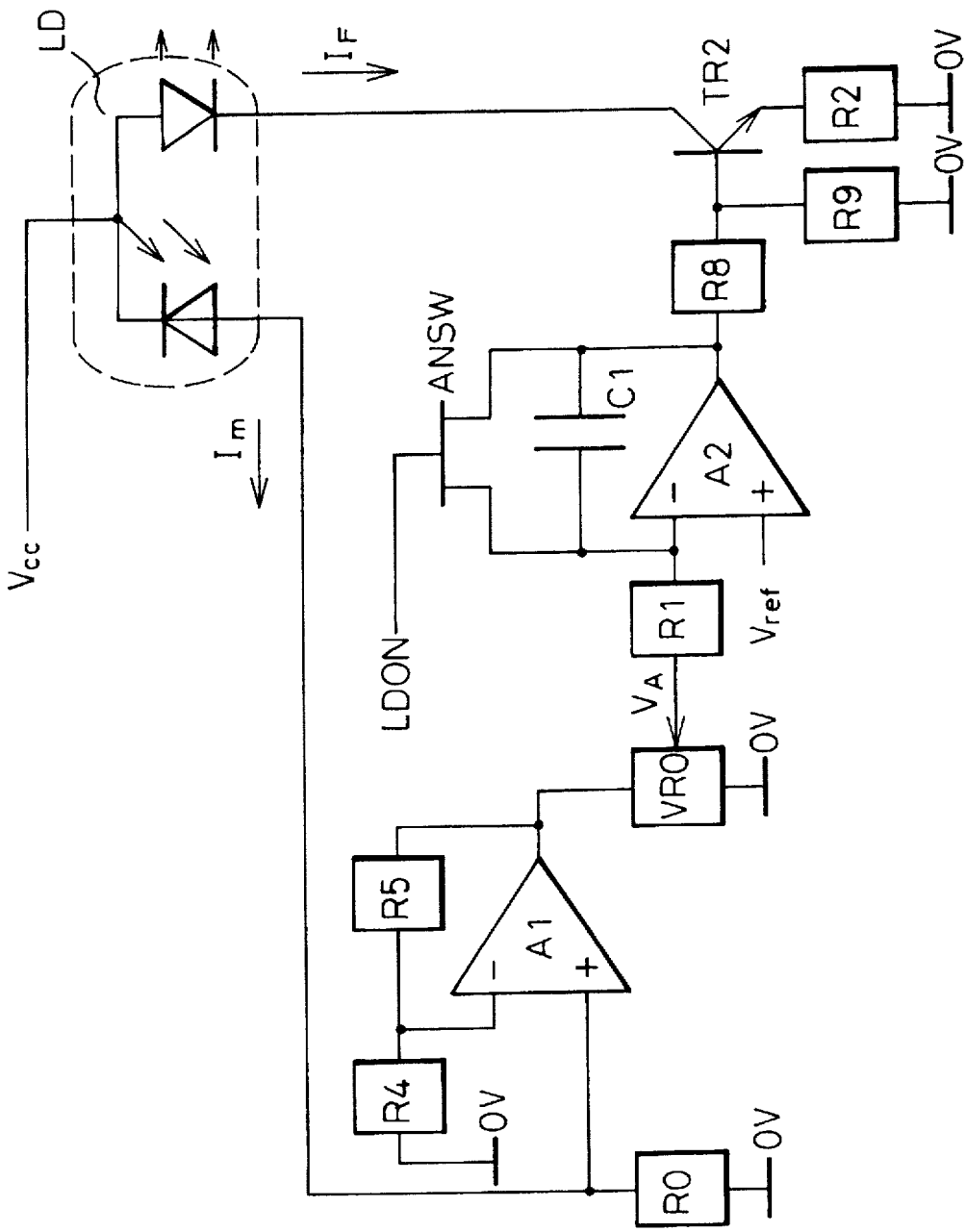
FIG. 14 is a schematic of an automatic power control circuit in the laser beam generation control unit in FIG. 2.

FIG. 14 is a schematic of an automatic power control circuit. In order to keep the light quantity (i.e., level) of the laser beam constant, a laser diode drive current $I_F$ is controlled by current Im that indicates the light quantity of the laser beam, as detected by a photodiode. The current Im is converted into a voltage resistor $R_0$ and then the voltage is divided into a voltage $V_A$ in response to a predetermined light quantity by a variable resistor $VR_0$. The voltage $V_A$ is compared by an operational amplifier A2 with a reference voltage $V_{REF}$ and integrated to be converted into the laser diode drive current $I_F$ by a transistor $TR_2$. The light quantity of the laser beam is set by the variable resistor $VR_0$. When the light quantity of the laser beam is the same as the predetermined value, the voltage $V_A$ and the reference voltage $V_{REF}$ hold the same potential. When an analog switch ANSW is turned ON by an operating control signal LDON, the charge of a capacitor C1 is discharged and the output voltage of the operational amplifier A2 is the same as the reference voltage $V_{REF}$. When the output voltage is divided by resistors R8 and R9, since the resistance values of resistors $R_8$ and $R_9$ are set such that the transistor TR2 is turned OFF, the laser is turned OFF.

Figure 15:
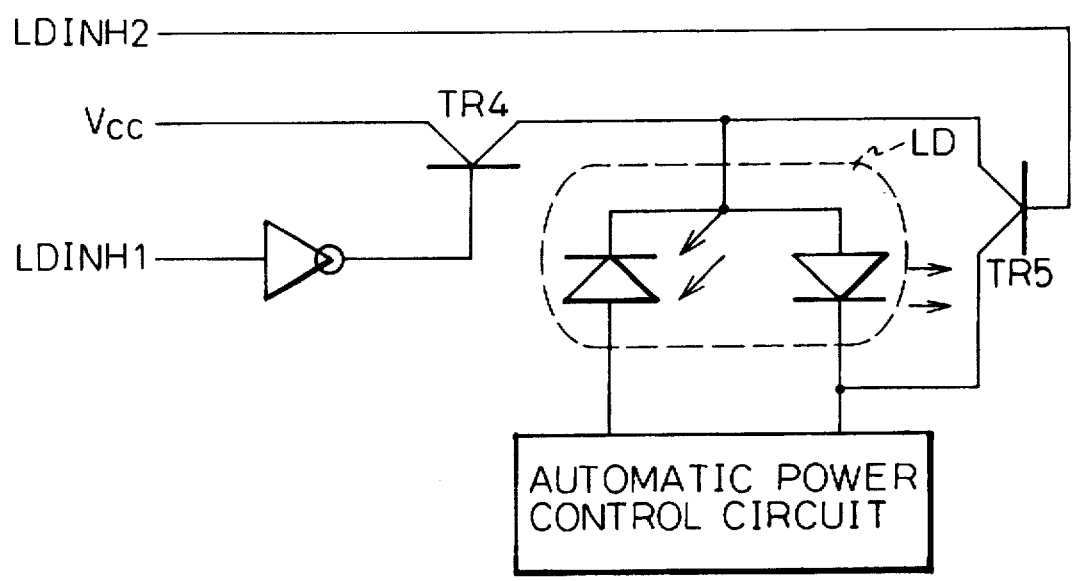
FIG. 15 is a schematic of a laser turn-ON inhibition circuit in FIG. 2.

FIG. 15 is a schematic view showing a laser turn-ON inhibition circuit. The circuit of FIG. 15 functions such that, when a motor is being stopped or any fault is detected in the laser drive circuit, turning-ON of the laser is prohibited.

When a transistor TR4 is turned OFF by a signal LDINH 1, current to the laser diode LD is interrupted; whereas a transistor TR5 is turned ON by a signal LDINH 2, current does not flow to the laser diode to turn OFF the laser.

FIG. 16 is a timing chart showing a laser diode control method according to a duty cycle drive control system.

In general, an He-Ne laser for an optical bar code scanner is turned ON continuously except in an AUTO-OFF time or a WAIT mode time. But in a laser diode, a fine turn ON/OFF control system is adopted in accordance with the invention as a counter measure for prolongation of the laser diode's life.

In general, based on the predetermined lighting condition shown in FIG. 15, turning ON/OFF is repeated and, once a bar code is detected, the system is transferred to a continuous turn-ON state, whereas when a bar code is not detected for a definite time, a laser light rate (i.e., duty cycle ON time) is reduced gradually.

In FIG. 16, (1) dm1 state: dm 1 is a fully turn-ON state.

(2) dm2 state: the LD turns ON for 5 msec, turns OFF for 5 msec and when a read operation starts, it transfers to the dm1 state.

(3) dm3 state: the LD turns ON for 5 msec, turns OFF for 50 msec and when a read is started, it transfers to the dm1 state.

(4) Auto-OFF1: the LD turns OFF while the motor continues rotating and when a start switch is depressed, it transfers to the dm2 state.

(5) Auto-OFF2: the LD turns OFF, the motor is stopping and when a start switch is depressed, the motor is started and after an initial check, it transfers to the dm2 state.

For example,

| dmT1 | 5 sec | For a time point of read starting a LD starts. |
|---|---|---|
| dmT2 | 115 sec | |
| dmT3 | 13 minutes | dmT1 + dmT2 + dmT3 = 15 minutes |
| dmT4 | 15 minutes | dmT1 + dmT2 + dmT3 + dmT4 [+] = 30 minutes. |

The above description is carried out when a laser diode is used as a laser generation element, but the present invention is not limited thereto and any element that can generate a laser beam may be used. Further, while the description is offered in the case where the present invention is applied to a bar code reading device, the present invention is not limited to said case, but is also applicable to a mark reader device, such as a bar code utilizing a laser device.

In the above description, a mark reading portion refers to the whole of FIG. 2 which include a laser beam generation control unit, an amplifier circuit, a binary-coded circuit, a signal processor unit and so the like.

We claim:

1. A laser beam generation control system of an optical mark reader device including a laser beam generating element, a laser beam generation control unit, a laser beam scanner unit for scanning a mark, and a signal processor unit for photoconverting a reflected light and thereby to produce a barcode read signal corresponding to a scanned mark, said laser beam generation control unit comprising:

an ON/OFF generator which generates an ON/OFF output signal defining predetermined duty cycles; and a drive circuit responsive to the ON/OFF output signal and which turns ON/OFF the laser generating element in accordance with the predetermined duty cycles thereby to generate laser beam intermittently, wherein the laser beam generation control unit controls the ON/OFF generator to produce a first ON/OFF output signal in which a first time period of the ON portion of a first duty cycle, controlling the intermittent generation of said laser beam, is greater than the time period of completing one complete scan of the scanning pattern by the laser scanner unit, and the laser beam generation control unit controls the ON/OFF generator to produce a second ON/OFF output signal in which a second time period of a second duty cycle, controlling the intermittent generation of said laser beam, is greater than the time period of completing the first duty cycle.

2. The system according to claim 1, wherein said signal processor unit comprises:

a detector detecting light reflected from the mark scanned by the laser beam and operative, when a reflected light beam from the mark is not detected for more than a predetermined time during the intermittent generation of the laser beam, to produce a first detector output signal; and said laser beam generation control unit being responsive to the first detector output signal for controlling the ON/OFF generation so as to gradually reduce the duty cycle of the ON/OFF signal.

3. A laser beam generation control system according to claim 1, wherein said laser beam generation control unit, while turning ON/OFF the laser generation element to generate a laser beam intermittently, is responsive to a second detector output signal indicating the detection of a reflected light beam from the mark during the intermittent generation of the laser beam, for controlling the drive circuit so as to turn the laser generating element ON continuously and thereby to generate the laser beam continuously and is further responsive to a third detector output signal indicating that a reflected light from the mark is not detected for more than a predetermined first time period during the continuous generation of the laser beam for controlling the drive circuit to switch from continuous generation to intermittent generation of the laser beam.

4. A laser beam generation control system of an optical mark reader device as claimed in claim 1, wherein after a predetermined time where the laser beam generation control unit is outputting second ON/OFF output signals and a mark is not detected by the laser beam scanner unit, the laser beam element is turned off.

5. The system according to claim 3, wherein:

said laser beam generation control unit further is responsive to a fourth detector output signal indicating that a reflected light from the mark is not detected for more than a predetermined period of time during an intermittent generation of the laser beam, for controlling the drive circuit so as to terminate further generation of the laser beam.

6. The system according to claim 5, wherein:

said laser scanner unit comprises an optical system and a motor for driving the optical system for deflecting the laser beam through a scanning pattern; and the laser beam generation control unit further is operative, when terminating the generation of the laser beam for also terminating the operation of the drive motor.

7. The system according to claim 6, wherein:

said laser beam generating control unit is responsive to the scanning of a mark by the laser beam according to a scanning pattern and when said laser beam is being generated intermittently, for controlling the ON period of the ON/OFF output signal of the ON/OFF generator to be greater than a period of time required for scanning the laser beam through a complete said scanning pattern.

8. The system according to claim 5, wherein:

the laser beam generation control circuit is responsive to the restart of the optical mark reader device, following the termination of operation of the drive motor, for delaying the operation of the drive circuit and thus the turn ON of the laser generation element until after a resumption of the operation, and thus rotation, of the drive motor is acknowledged.

9. The system according to claim 1, wherein said signal processor unit comprises:

a detector for detecting the light reflected from the mark scanned by the laser beam and operative, when a reflected light from the mark is not detected for more than a predetermined period of time, for producing a first detector output signal;

the laser beam scanner unit comprises an optical system and a drive motor for driving the optical system in rotation for reflecting the laser beam through a scanning pattern; and the laser beam generation control unit is responsive to the first detector output signal for terminating further generation of the laser beam and the operation of the drive motor.

10. The system according to claim 1, wherein the mark being scanned comprises a barcode, and wherein:

the laser generation control unit is responsive to a detector output signal representing a repeated ON/OFF operation of the laser scanning beam and a further detector output signal representative of the detection of a bar code, the laser generation control unit controls the drive circuit to switch the laser generation element to a continuous ON state and, when the detector output signal indicates that a bar code is not detected for a definite time, the laser generation control unit controls the ON/OFF generator and correspondingly the drive circuit for progressively reducing the ON portion of the ON/OFF duty cycle of the generation of the laser beam by the laser generation element.

11. A laser beam generating control system of an optical mark reader device comprising:

a laser scanner unit comprising:

a laser beam generator comprising a laser diode which generates a laser beam, a laser diode driver unit which generates a laser beam driver control signal which selectively turns the laser beam generator ON/OFF, a scanning optical system comprising an optical element and a motor drive unit which drives the optical element in rotation and which receives the laser beam from the laser beam generator and reflects same for scanning the laser beam in the plane of a mark to be read; and a laser beam generation control unit, comprising:

a laser beam control signal generator outputting a laser beam generator control signal, and an ON/OFF signal generator which generates an ON/OFF pulse signal output having a selectively controllable duty cycle, wherein the laser beam control unit turns ON/OFF the laser beam generator to generate a lower beam intermittently so that when a reflected light from the mark is detected during an intermittent generation of the laser beam, wherein the laser generation element is turned ON to generate the laser beam continuously, and so that when reflected light from the mark is not detected for more than a first predetermined time period during continuous generation of the laser beam, said system is switched from continuous generation to intermittent generation, wherein the laser beam generation control unit controls the ON/OFF generator to produce an ON/OFF output signal in which the time period of the ON portion of the duty cycle controlling the intermittent generation of said laser beam is greater than the time period of completing one complete scan of the scanning pattern by the laser scanner unit, and wherein when a reflected mark is not detected for a second predetermined time period which is greater than the first period of time during intermittent generation, the laser beam control signal generator controls the ON/OFF generator to produce an ON/OFF output signal less frequently than the time period of the ON portion of the duty cycle controlling the intermittent generation.

12. A laser beam generation control system of an optical mark reader device as claimed in claim 11, wherein after a predetermined time where the ON/OFF signal generator is outputting ON/OFF output signals and a mark is not detected by the laser beam scanning unit, the laser diode is turned off.

13. A laser beam generation control system of an optical mark reader device comprising:

a laser scanner unit comprising:

a laser beam generator comprising a laser diode which generates a laser beam.

a laser diode driver unit which generates a laser beam driver control signal which selectively turns the laser beam generator ON/OFF, a scanning optical system comprising an optical element and a motor drive unit which drives the optical element in rotation and which receives the laser beam from the laser beam generator and reflects same for scanning the laser beam in the plane of a mark to be read; and a laser beam generation control unit, comprising:

a laser beam control signal generator outputting a laser beam generator control signal, and an ON/OFF signal generator which generates an ON/OFF pulse signal output having a selectively controllable duty cycle, wherein the mark is scanned by the laser beam according to a predetermined scanning pattern, wherein a first generation time during a first intermittent generation of said laser beam is more than one period of the scanning pattern, and wherein when a mark has not been detected during the first intermittent generation of said laser beam, the ON/OFF signal generator generates a second ON/OFF pulse signal after a predetermined time period to establish a second generation time for generating the ON/OFF signal, the second generation time is more than the first generation time.

14. A laser beam generation control system of the optical mark reader device as claimed in claim 13, wherein said laser beam generation control unit turns ON/OFF the laser beam generator to generate the laser beam intermittently, wherein:

when a reflected light from the mark is detected during intermittent generation of the laser beam, the laser beam generator is turned ON to generate the laser beam continuously;

when a reflected light from the mark is not detected for more than a predetermined time period during a continuous generation of the laser beam, said system is switched from the continuous generation to the intermittent generation; and when a reflected light from the mark is not detected for more than a predetermined period of time during the intermittent generation of the laser beam, a generation of the laser beam is stopped.

15. A laser beam generation control system of an optical mark reader device including a laser beam generating element, a laser beam generation control unit, a laser beam scanner unit scanning a mark and having a drive motor, and a signal processor unit for photoconverting a reflected light and thereby to produce a barcode read signal corresponding to a scanned mark, said laser beam generation control unit comprising:

an ON/OFF generator which generates an ON/OFF output signal defining a predetermined duty cycle; and a drive circuit responsive to the ON/OFF output signal and which turns ON/OFF the laser generating element in accordance with the predetermined duty cycle thereby to generate laser beam intermittently, wherein the laser beam generation control unit controls the ON/OFF generator to produce an ON/OFF output signal in which the time period of the ON portion of the duty cycle controlling the intermittent generation of said laser beam is greater than the time period of completing one complete scan of the scanning pattern by the laser scanner unit, and the laser beam generating control unit controls the drive motor to gradually reduce the duty cycle and/or to terminate the operation of the drive motor to terminate further activation of the laser element so that the length of time of the intermittent generation of said laser beam increases until termination of activation of the laser element.

* * * * *

UNITED STATES PATENT AND TRADEMARK OFFICE
CERTIFICATE OF CORRECTION

PATENT NO. : 5,724,458
DATED : Mar. 3, 1998
INVENTOR(S) : KATOH et al.

It is certified that error appears in the above-identified patent and that said Letters Patent is hereby corrected as shown below:

TITLE PAGE: [73] Assignee: Change "Kawsaki" to --Kawasaki--.

Col. 1, line 21, change "Pot" to --For--.

Col. 6, line 15, change "$T_0>3.T_1$," to --$T_0>3 \cdot T_1$--;
line 16, change "$125.T_1>T_2>0.875.T_1$," to -- $125 \cdot T_1>T_2>0.875 \cdot T_1$--.

Signed and Sealed this

Thirtieth Day of June, 1998

Attest:

BRUCE LEHMAN

Attesting Officer

Commissioner of Patents and Trademarks